United States Patent [19]

Murakami et al.

[11] Patent Number: 5,204,396
[45] Date of Patent: Apr. 20, 1993

[54] LONG FIBER-REINFORCED POLYAMIDE RESIN COMPOSITION AND MOLDED ARTICLES THEREFROM

[75] Inventors: Haruji Murakami; Kazuhito Kobayashi; Masaru Miura; Mitsuru Yokouchi, all of Shizuoka, Japan

[73] Assignee: Polyplastics Co., Ltd., Osaka, Japan

[21] Appl. No.: 897,672

[22] Filed: Jun. 12, 1992

[30] Foreign Application Priority Data

Jun. 14, 1991 [JP] Japan .................................. 3-143252
Jul. 3, 1991 [JP] Japan .................................. 3-162699

[51] Int. Cl.$^5$ .............................. C08K 7/14; C08J 5/08
[52] U.S. Cl. ...................................... 524/394; 523/213; 524/397; 524/399; 524/494; 524/496; 524/606
[58] Field of Search ............... 524/394, 397, 399, 494, 524/496, 606; 523/213

[56] References Cited

U.S. PATENT DOCUMENTS

| | | | |
|---|---|---|---|
| 3,419,517 | 12/1968 | Hedrick et al. | 523/213 |
| 3,471,426 | 10/1969 | Hofton et al. | 524/394 |
| 3,498,872 | 3/1970 | Sterman et al. | 524/606 |
| 3,516,956 | 6/1970 | Reedy et al. | 524/394 |
| 3,639,331 | 2/1972 | Hattori et al. | 523/209 |
| 3,738,949 | 6/1973 | Schonberg et al. | 524/394 |
| 3,803,065 | 4/1974 | Arai et al. | 524/394 |
| 3,931,094 | 1/1976 | Segal et al. | 524/494 |
| 3,962,172 | 6/1976 | Warmb et al. | 524/494 |
| 3,968,071 | 7/1976 | Miyamoto et al. | 525/432 |
| 3,988,271 | 10/1976 | Phillips | 524/394 |
| 4,131,591 | 12/1978 | MacFarlane | 523/213 |
| 4,500,668 | 2/1985 | Shimizu et al. | 524/494 |
| 4,607,073 | 8/1986 | Sakashita et al. | 524/494 |
| 4,740,538 | 4/1988 | Sekutowski | 524/606 |
| 4,791,027 | 12/1988 | Reimann et al. | 524/606 |
| 4,891,392 | 1/1990 | Abe et al. | 523/209 |
| 5,132,342 | 7/1992 | Chillous et al. | 524/494 |

*Primary Examiner*—Veronica P. Hoke
*Attorney, Agent, or Firm*—Nixon & Vanderhye

[57] ABSTRACT

Long fiber-reinforced normally solid polyamide resin compositions and molded articles formed thereof include a polyamide base resin, between 5 to 80% by weight of reinforcing fibers having a length of at least 3 mm, and between 0.01 to 3% by weight of a processing aid. The processing aid is a lithium salt of a fatty acid or a metal salt of a fatty acid having 22 to 32 carbon atoms. The compositions are preferably in the form of a generally cylindrical pellet having a length of 3 to 50 mm such that the reinforcing fibers are substantially as long as the pellet in which they are incorporated, and are oriented parallel to one another along the longitudinal axis of the pellet.

11 Claims, No Drawings

LONG FIBER-REINFORCED POLYAMIDE RESIN COMPOSITION AND MOLDED ARTICLES THEREFROM

FIELD OF INVENTION

The present invention generally relates to fiber-reinforced polyamide resin compositions and to molded articles formed therefrom. More specifically, the present invention relates to polyamide resins which are reinforced with relatively long fibers. The long fiber-reinforced polyamide resin compositions of the present invention exhibit excellent moldability properties (e.g., improved extruder screw "bite", melt-flow and anti-fuming characteristics), as well as exceptional mechanical strength properties.

BACKGROUND AND SUMMARY OF THE INVENTION

The reinforcement of thermoplastic resins by dispersing fibrous materials, such as glass fibers, so as to improve the mechanical strength properties of the resulting resin composition is well known. In particular, fiber-reinforced polyamide resins are typically produced by mixing a polyamide base resin with relatively short fibers, such as chopped fibrous strands. The polyamide base resin and short fibers are then mixed and extruded to form a fiber-reinforced polyamide resin composition. However, conventional processing techniques to obtain fiber-reinforced polyamide resin compositions cannot satisfy the need for greater mechanical strength properties, since the fiber reinforcement medium will unavoidably break into even shorter fiber segments during extrusion thereby decreasing its reinforcing effectiveness.

Investigations have been conducted recently so as to form polyamide resin compositions with a relatively long fiber-reinforcement medium in an attempt to achieve maximum reinforcement benefit from the presence of the long fibers. In this connection, it has been proposed to produce long fiber-reinforced polyamide resin compositions by simultaneously drawing the reinforcement fibers and impregnating the reinforcement fibers with a polyamide resin (for example, an emulsion, solution or melt of polyamide resin).

These prior attempts to achieve a polyamide resin composition which was reinforced with a relatively long fiber medium, however, encountered several problems. For example, such prior long fiber-reinforced polyamide resin compositions experienced molding difficulties, such as incomplete filling of the mold cavity due to hopper "breathing" (so-called "short-shots"), poor extruder screw "bite", and overall poor fluidity characteristics. Adding a conventional slip additive, such as aluminum stearate, zinc stearate or calcium stearate, to compositions which contain a long fiber reinforcement medium does not solve such problems and, in fact, creates further problems in terms of violent fuming (gas generation) when the resin is purged during molding. Furthermore, there is a tendency for the molded article to become scorched when such a material is molded, thereby detracting from its visual appearance.

The problems noted above are peculiar to polyamide resin which contain relatively long fibers as a reinforcing medium. It is presumed that these problems are attributable to the incorporation of a large amount of air into the resin during plasticization by the screw-extruder and/or by virtue of localized heat build-up caused by shear forces. However, no detailed mechanisms have been identified as to the precise causes for the problems stated above when long fibers are incorporated into a polyamide base resin. It is therefore towards providing a solution to the problems associated with incorporating a long fiber reinforcement medium into a polyamide base resin which the present invention is directed.

Broadly, the present invention is directed toward polyamide compositions which include a processing aid exhibiting selective beneficial effects when employed in combination with a relatively long fiber reinforcement medium. More specifically, the present invention is directed to polyamide resin compositions and to molded articles formed thereof which is composed of a blend of a polyamide base resin, a long fiber reinforcement medium, and a processing aid which is at least one selected from (i) a lithium salt of a fatty acid, or (ii) a metal salt of a fatty acid having between 22 to 32 carbon atoms. In preferred embodiments, the compositions of this invention will include, based on the total composition weight, between 5 to 80 wt. % of reinforcing fibers having a length of at least 3 mm, and between 0.01 to 3 wt. % of the processing aid.

The polyamide resin compositions according to the present invention are most preferably in the form of generally cylindrical pellets having a length between 3 to 50 mm. Thus, according to this invention, the fibrous reinforcing medium most preferably has a length which is substantially coextensive with, and will be oriented in the longitudinal direction of, the formed composition pellets.

Further aspects and advantages of this invention will become more clear after careful consideration is given to the following detailed description of the preferred exemplary embodiments thereof.

DETAILED DESCRIPTION OF THE PREFERRED EXEMPLARY EMBODIMENTS

The polyamide base resin that may be used in the present invention includes nylon 6, nylon 66, nylon 11, nylon 12, nylon 6.10 and nylon 6.12. However, the polyamide base resin is not limited to nylons and thus virtually any known thermoplastic polyamide resin may be used. A mixture of two or more such polyamide base resins can also be employed, if desired. From the viewpoint of composition properties, such as long-term heat-stability, heat-resistance and mechanical strength. A polyamide base resin which is mainly comprised of nylon 66 is preferred for use in the compositions of the present invention. In such a case, the effect of the processing aid—i.e., a lithium salt of a fatty acid, or a metal salt of a fatty acid having 22 to 32 carbon atoms—is particularly noticeable.

The types of reinforcing fibers that may be used in the present invention are not particularly limited. For example, glass fibers, carbon fibers, metal fibers and high-melting (or high-softening) resin fibers are usable.

According to the present invention, 5 to 80% by weight (based on the entire composition weight) of reinforcing fibers having a fiber length of at least 3 mm are incorporated into the composition. The length of the fibers is determined after the fibers are incorporated into the composition. Thus, according to this invention, the length of the reinforcing fibers is selected such that, after blending with the polyamide base resin and processing aid, the fibers will have a length which is at least 3 mm, and most preferably, a length which is substantially coextensive with the length of the generally cylindrical composition pellet which is ultimately obtained.

When the amount of the reinforcing fibers is less than 5% by weight, an insufficient reinforcement effect of the fibers results. On the other hand, when the reinforcing fiber content exceeds 80% by weight, poor processability during production of the composition and re-molding results, improved strength properties cannot be realized. In terms of balancing the reinforcing effects of the fibers and the processability of the resin composition, the amount of the fibers is preferably between 20 to 70% by weight, particularly between 30 to 65% by weight (based on the entire composition weight).

The reinforcing fibers need not be entirely long fibers as discussed above. Thus, a minor amount of relatively short fibers (i.e., a length less than 3 mm) may be incorporated into the compositions of this invention, in addition to the above-described long fibers, provided that the total amount of the reinforcing fibers that is employed does not exceed 80% by weight.

The present invention is especially characterized by the incorporation of a specific processing aid. The processing aid that is used in the compositions of this invention is a lithium salt of a fatty acid, or a metal salt of a fatty acid having 22 to 32 carbon atoms. When a metal salt other than a lithium salt, such as zinc, calcium or aluminum salts of a fatty acid having less than 22 carbon atoms or more than 32 carbon atoms, e.g. zinc laurate, calcium laurate, aluminum laurate, zinc myristate, calcium myristate, aluminum myristate, zinc palmitate, calcium palmitate, aluminum palmitate, zinc stearate, calcium stearate, aluminum stearate, zinc oleate, calcium oleate or aluminum oleate, is used as the processing aid, the thermal stability of the composition is inferior thereby causing processing problems, such as fuming or gas generation during molding as well as possible scorching of the molded article. On the other hand, use of a lithium salt of a fatty acid or a metal salt of a fatty acid having 22 to 32 carbon atoms according to the present invention serves to prevent such problems, thereby exhibiting excellent processing effects and improving the composition's moldability. Specific compounds that may be used as the processing aid in the compositions of the present invention include lithium, zinc, calcium and aluminum salts of behenic, montanic, melissic, lacceric and erucic acids.

The amount of the processing aid (i.e., the lithium salt of a fatty acid or a metal salt of a fatty acid having 22 to 32 carbon atoms) that may be used in the compositions of the present invention is between 0.01 to 3% by weight (based on the entire composition weight). When the amount of the processing aid is less than 0.01% by weight, little, if any, beneficial effects are realized. When the processing aid is employed in amounts exceeding 3% by weight, the composition and/or molded article formed therefrom is colored. Furthermore, problems such as mold deposits sometimes occur. The amount of the processing aid is most preferably between 0.02 to 1% by weight (based on the entire composition weight).

In the present invention, the processing aid may be incorporated into a composition comprised of the polyamide base resin and the reinforcing fibers as an internal slip additive. Alternately, the processing aid may be applied into the surface of the composition comprised of the polyamide base resin and the reinforcing fibers—i.e., so as to function as an external slip additive. Of course, the combined use of the lithium salt of a fatty acid with the metal salt of a fatty acid having 22 to 32 carbon atoms internally and/or externally as described may also be used.

Although processes for producing the compositions of the present invention are not particularly limited, those processes wherein substantially no shear forces are applied to the fibers is preferred in order to protect the fibers from excessive breakage. In this regard, a pultrusion process is particularly preferred.

The pultrusion process essentially includes impregnating continuous reinforcing fibers with a resin while the fibers are being drawn. Pultrusion processing includes other known techniques including passing fibers through an impregnation bath containing an emulsion, suspension or solution of a resin or a molten resin; spraying a resin powder onto surfaces of fiber or passing through a tank containing the resin powder so that the resin powder is applied to the fibers and thereafter melted so as to impregnate the fibers and, passing fibers through a crosshead die while feeding a resin into the crosshead die from an extruder or the like to thereby impregnate the fibers. The resin composition thus obtained is preferably shaped into generally cylindrical pellets having a length of 3 to 50 mm prior to injection molding. In this case, the reinforcing fibers are substantially coextensive with the longitudinal length of the pellet and are oriented substantially parallel to one another along the longitudinal axis of the pellet. In the case of a resin composition wherein the long fibers are arranged in one direction and the fiber length is uniform, the presence of a slip additive is often particularly necessitated so as to enhance fluidization of the pellet during molding, fluidization of the molten resin during plasticization, or to enable homogeneous mixing of the fibers. The incorporation of the lithium salt of a fatty acid, or the metal salt of a fatty acid having 22 to 32 carbon atoms, as a slip additive (processing aid) is particularly effective for such purposes. For example, when the resin composition of the present invention is subjected to injection molding, the beneficial effects of the processing aid is particularly noticeable.

The resin composition of the present invention can be used in combination with one or more other thermoplastic resins provided that the effects achieved according to the present invention are not seriously inhibited. The resin composition can also contain known additives usually incorporated into thermoplastic resins, such as stabilizers, e.g. antioxidants, thermal stabilizers and ultraviolet absorbers, antistatic agents, flame retardants and flame-retarding assistants, colorants, e.g. dyes and pigments, lubricants, plasticizers, crystallization accelerators, and nucleators. Furthermore, the compositions can be used in combination with a suitable amount of a platy, powdery or granular inorganic compound such as glass flakes, mica, glass powder, glass beads, talc, clay, alumina, carbon black or wollastonite, or whiskers.

As will be apparent from the above discussion, the long fiber-reinforced polyamide resin compositions of the present invention which are comprised of a polyamide base resin reinforced with long reinforcing fibers, and further containing a processing aid in the form of a lithium salt of a fatty acid or a metal salt of a fatty acid having 22 to 32 carbon atoms, has exceptional mechanical properties (such as tensile strength, bending strength and impact strength) since it is reinforced with long fibers. Furthermore, the "bite" of the resin by the molding machine and the fluidity of the resin are improved by the incorporation of the specific processing aid described previously (i.e., a lithium salt of a fatty acid or the metal salt of a fatty acid having 22 to 32 carbon atoms). In addition, such problems as fuming or gas generation during injection molding and/or scorching of molded articles are not experienced with the compositions of the present invention. Thus, the compositions of the present invention exhibit excellent characteristics thereby rendering them commercially viable.

EXAMPLES

The following non-limiting Examples will further illustrate the present invention.

EXAMPLES 1 TO 4 AND COMPARATIVE EXAMPLES 1 TO 5

A glass roving was opened and the obtained filaments were drawn and simultaneously impregnated with a molten mixture of a polyamide resin (nylon 66) and lithium salt of a fatty acid, passed through a shaping die and taken off in the form of a strand, which was cut to obtain a composition in the form of a pellet having a length of 12 mm and comprising components given in Table 1 (Examples 1, 2 and 4). Separately, the same glass roving as that described was impregnated with only the polyamide resin (nylon 66) and shaped into pellets having a length of 12 mm, which were blended with lithium salt of a fatty acid (Example 3) in the same manner as that described above.

For comparison, a composition in the form of a pellet impregnated with a molten mixture of the polyamide resin (nylon 66) and a slip additive other than that of the present invention (Comparative Examples 1, 2 and 4), a composition in the form of a pellet impregnated with only the polyamide resin (nylon 66) and then blended with a slip additive other than than of the present invention (Comparative Example 3) and a composition in the form of a pellet impregnated with only the polyamide resin (nylon 66) and free from any slip additive (Comparative Example 5) were also produced in the same manner as that described above.

These pellet-shaped compositions were injection-molded and the products were evaluated to obtain the results given in Table 1. The evaluation methods were as follows:

Fuming phenomenon: The resin composition was plasticized on an injection-molding machine and then left to flow freely. The quantity of the fumes generated at the tip of the nozzle was determined by visual observation, and evaluated according to the following qualitative scale:

$$1 \ldots \ldots \ldots \ldots \ldots \ldots 5$$
(virtually no fuming)    (vigorous fuming)

Molded article scorching: Scorching (color change) of the molded article obtained by the injection molding was determined by visual observation, and evaluated according to the following qualitative scale:

$$1 \ldots \ldots \ldots \ldots \ldots \ldots 5$$
(no scorching)    (severe scorching)

Bite by molding machine: The resin composition was plasticized on an injection-molding machine and the extent of the bite of the pellet to the screw during molding step was observed, and evaluated according to the following qualitative scale:

$$1 \ldots \ldots \ldots \ldots \ldots \ldots 5$$
(good)    (slight bite/breathing in hopper)

TABLE 1

|  | Ex. 1 | Ex. 2 | Ex. 3 | Ex. 4 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- | --- |
| Composition | glass fiber 40 wt. % LiSt 0.03 wt. % | glass fiber 40 wt. % LiPa 0.03 wt. % | glass fiber 40 wt. % LiSt 0.03 wt. % | glass fiber 40 wt. % LiSt 0.05 wt. % | glass fiber 40 wt. % ZnSt 0.03 wt. % | glass fiber 40 wt. % AlSt 0.03 wt. % | glass fiber 40 wt. % ZnSt 0.03 wt. % | glass fiber 40 wt. % ZnSt 0.05 wt. % | glass fiber 40 wt. % — |
| Slip additive mixing method | melt mixing | melt mixing | external blending | melt mixing | melt mixing | melt mixing | external blending | melt mixing | — |
| Fuming phenomenon | 1 | 2 | 2 | 2 | 5 | 5 | 5 | 5 | 1 |
| Scorch of molding | 1 | 1 | 1 | 1 | 4 | 4 | 4 | 5 | 1 |
| Bite to molding machine | 1 | 1 | 1 | 1 | 1 | 1 | 1 | 1 | 5 |

Slip additive:
LiSt: lithium stearate
LiPa: lithium palmitate
ZnSt: zinc stearate
AlSt: aluminum stearate

EXAMPLES 5 TO 9 AND COMPARATIVE EXAMPLES 1 AND 3 TO 6

A glass roving was opened and the obtained filaments were drawn and simultaneously impregnated with a molten mixture of a polyamide resin (nylon 66) and a metal salt of a fatty acid having 22 to 32 carbon atoms, passed through a shaping die and taken off in the form of a strand, which was cut to obtain a composition in the form of a pellet having a length of 12 mm and comprising components given in Table 2 (Examples 5, 6, 7 and 9). Separately, the same glass roving as that described above was impregnated with only the polyamide resin (nylon 66) and shaped into pellets having a length of 12 mm, which were blended with a metal salt of a fatty acid having 22 to 32 carbon atoms (Example 8) in the same manner as that described above.

For comparison, a composition in the form of a pellet impregnated with a molten mixture of the polyamide resin (nylon 66) and a slip additive other than that of the present invention (Comparative Examples 1, 6 and 4), a composition in the form of a pellet impregnated with only the polyamide resin (nylon 66) and then blended with a slip additive other than that of the present invention (Comparative Example 3) and a composition in the form of a pellet impregnated with only the polyamide resin (nylon 66) and free from any slip additive (Comparative Example 5) were also produced in the same manner as that described above.

These pellet-shaped compositions were injection-molded and the products were evaluated to obtain the results given in Table 2. The evaluation methods were as described above (See Examples 1 to 4 and Comparative Examples 1 to 5).

TABLE 2

| | Ex. 5 | Ex. 6 | Ex. 7 | Ex. 8 | Ex. 9 | Comp. Ex. 1 |
|---|---|---|---|---|---|---|
| Composition | glass fiber 40 wt. % ZnMon 0.03 wt. % | glass fiber 40 wt. % CaMon 0.03 wt. % | glass fiber 40 wt. % CaBeh 0.03 wt. % | glass fiber 40 wt. % ZnMon 0.03 wt. % | glass fiber 40 wt. % ZnMon 0.5 wt. % | glass fiber 40 wt. % ZnSt 0.03 wt. % |
| Slip additive mixing method | melt mixing | melt mixing | melt mixing | external blending | melt mixing | melt mixing |
| Fuming phenomenon | 1 | 1 | 1 | 1 | 1 | 5 |
| Scorch of molding | 1 | 1 | 1 | 1 | 1 | 4 |
| Bite to molding machine | 1 | 1 | 1 | 1 | 1 | 1 |

| | | Comp. Ex. 6 | Comp. Ex. 3 | Comp. Ex. 4 | Comp. Ex. 5 |
|---|---|---|---|---|---|
| | Composition | glass fiber 40 wt. % CaLau 0.03 wt. % | glass fiber 40 wt. % ZnSt 0.03 wt. % | glass fiber 40 wt. % ZnSt 0.5 wt. % | glass fiber 40 wt. % — |
| | Slip additive mixing method | melt mixing | external blending | melt mixing | — |
| | Fuming phenomenon | 5 | 5 | 5 | 1 |
| | Scorch of molding | 4 | 4 | 5 | 1 |
| | Bite to molding machine | 1 | 1 | 1 | 5 |

Slip additive:
ZnMon: zinc montanate
CaMon: calcium montanate
CaBeh: calcium behenate
ZnSt: zinc stearate
CaLau: calcium laurate While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A long fiber-reinforced normally solid polyamide resin composition comprising, based on the total composition weight:
   (A) a polyamide base resin;
   (B) between 5 to 80% by weight of reinforcing fibers having a length of at least 3 mm; and
   (C) between 0.01 to 3% by weight of a processing aid which is at least one selected from (C-1) a lithium salt of a fatty acid, and (C-2) a metal salt of a fatty acid having 22 to 32 carbon atoms.

2. The long fiber-reinforced polyamide resin composition according to claim 1, which is in the form of a generally cylindrical pellet having a length of 3 to 50 mm and wherein the reinforcing fibers are substantially as long as the pellet and oriented parallel to one another along the longitudinal axis of the pellet.

3. The long fiber-reinforced polyamide resin composition according to claim 1, wherein said processing aid is at least one selected from lithium, zinc, calcium and aluminum salts of behenic, montanic, melissic, lacceric and erucic acids.

4. The long fiber-reinforced polyamide resin composition according to claim 1, wherein said processing aid is dispersed within said composition.

5. The long fiber-reinforced polyamide resin composition according to claim 1, wherein said processing aid is on an external surface of said composition.

6. An injection-molded article which consists essentially of the long fiber-reinforced polyamide resin composition according to any one of claims 1-5.

7. In a method of making a long-fiber reinforced polyamide resin composition comprising incorporating between 5 to 80% by weight of reinforcing fibers having a length of at least 3 mm within a polyamide base resin, the improvement comprising incorporating said reinforcing fibers within said polyamide base resin in the presence of between 0.01 to 3% by weight, based on the total composition weight, of a processing aid which is at least one selected from a lithium salt of a fatty acid, and a metal salt of a fatty acid having 22 to 32 carbon atoms.

8. The process as in claim 7, which further includes forming the composition into generally cylindrical pellets having a length of 3 to 50 mm such that the reinforcing fibers are substantially as long as the pellet in which they are incorporated and are oriented parallel to one another along the longitudinal axis of the pellet.

9. The process according to claim 7, wherein said processing aid is at least one selected from lithium, zinc, calcium and aluminum salts of behenic, montanic, melissic, lacceric and erucic acids.

10. The process according to claim 7, which comprises dispersing said processing aid within said polyamide base resin.

11. The process according to claim 8, which comprises applying said processing aid onto an external surface of said pellets.

* * * * *